(12) United States Patent
Takahashi

(10) Patent No.: US 6,744,916 B1
(45) Date of Patent: Jun. 1, 2004

(54) IMAGE PROCESSING APPARATUS AND METHOD FOR INTERPOLATING MISSING PIXELS

(75) Inventor: Sadao Takahashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/441,051

(22) Filed: Nov. 16, 1999

(30) Foreign Application Priority Data

Nov. 24, 1998 (JP) .......................................... 10-332793

(51) Int. Cl.[7] .............................. G06K 9/00; H04N 3/14; H04N 5/235

(52) U.S. Cl. ..................... 382/162; 348/272; 348/229.1; 348/222.1

(58) Field of Search ................................ 382/300, 254, 382/266, 162, 167, 269; 348/272, 260, 277, 273, 229.1, 222.1; 358/1.9

(56) References Cited

U.S. PATENT DOCUMENTS 5,506,619 A * 4/1996 Adams et al. ............... 348/272
6,091,862 A * 7/2000 Okisu ......................... 382/300
6,570,616 B1 * 5/2003 Chen .......................... 348/272

FOREIGN PATENT DOCUMENTS

JP 5-75861 3/1993 ............ H04N/1/40

OTHER PUBLICATIONS

Docket No. 0557–4834–2* U.S. patent application Ser. No. 09/441,051, Takahashi, filed Nov. 16, 1999.

Docket No. 236488US2, U.S. patent application Ser. No. 10/411,308, Furuta et al., filed Apr. 11, 2003.

Docket No. 0557–4834–2*, U.S. patent application Ser. No. 09/441,051, Takahashi, filed Nov. 16, 1999.

Docket No. 238305US2, U.S. patent application Ser. No. 10/447,223, Takahashi et al., filed May 29, 2003.

* cited by examiner

Primary Examiner—Wenpeng Chen
(74) Attorney, Agent, or Firm—Oblon, Spivak, McClelland, Maier & Neustadt, P.C.

(57) ABSTRACT

The image processing apparatus, which obtains pixels having missing image signals through interpolation which pixels are arranged between the pixels in a horizontal direction and a vertical direction having the image signals, comprises a brightness-signal interpolating section which generates interpolation signals of a pixel to be interpolated according to each degree of changes in image signals of four adjacent pixels located at positions surrounding said pixel to be interpolated as well as to each degree of changes in image signals of the pixel to be interpolated. Therefore, an image having high resolution and smooth outline can be reproduced.

52 Claims, 4 Drawing Sheets

| G | R | G | R |
|---|---|---|---|
| B | G | B | G |
| G | R | G | R |
| B | G | B | G |

|  | i-1 | i | i+1 | i+2 |
|---|---|---|---|---|
| j-1 | G | R | G | R |
| j | B | G | B | G |
| j+1 | G | R | G | R |
| j+2 | B | G | B | G |

# IMAGE PROCESSING APPARATUS AND METHOD FOR INTERPOLATING MISSING PIXELS

FIELD OF THE INVENTION

The present invention relates to an image processing apparatus and method thereof. More particularly, this invention relates to an image processing apparatus and method thereof which can interpolate the image signals of missing pixels.

BACKGROUND OF THE INVENTION

Figure 4:
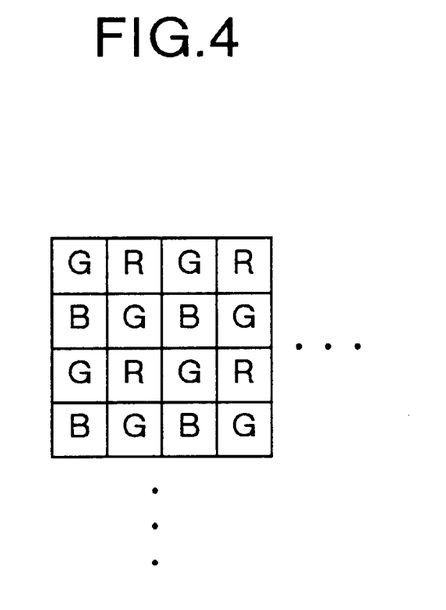
FIG. 4 shows a single-plate color CCD with color filters of RGB arranged thereon in a checkered pattern.

When a single-plate color CCD on which color filters of RGB as shown in FIG. 4 are arranged in a checkered pattern (RGB are arranged in every alternate pixel in the horizontal and vertical directions) is used, each of the pixels can have only one signal component out of the colors RGB. In such a case the remaining two color components are required to be obtained by interpolation.

Figure 5:
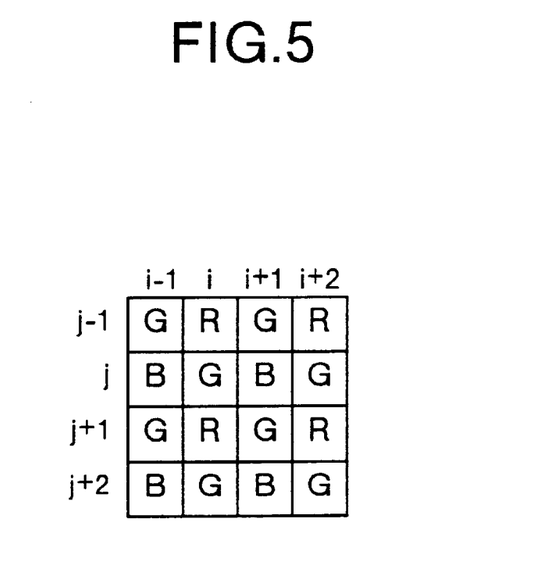
FIG. 5 explains the conventional type of interpolating method.

In the conventional interpolation missing pixels (meaning pixels with missing values) are obtained simply by using an average of pixels around each of the missing pixels. More specifically, assuming that each pixel of the color CCD is represented by (j, i) as shown in FIG. 5, interpolation is performed through computations 1 to 4 described below.
1) Interpolation at a position of G (i, j)
    R=(R (i, j−1)+R (i, j+1))/2
    G=G (i, j)
    B=(B (i−1, j)+B (i+1, j))/2
2) Interpolation at a position of B (i+1, j)

R = ((R (i, j−1) + R (i, j+1) + R (i+2, j−1) +
    R (i+2, j+1)) / 4
G = ((G (i+1, j−1) + G (i, j) + G (i+2, j) +
    G (i+1, j+1)) / 4
B = B (i+1, j)

3) Interpolation at a position of R (i, j+1)

R = R (i, j+1)
G = ((G (i, j) + G (i−1, j+1) + G (i+1, j+1) +
    G (i+1, j+2)) / 4
B = ((B (i−1, j) + B (i+1, j) + B (i−1, j+2) +
    B (i+1, j+2)) / 4

4) Interpolation at a position of G (i+1, j+1)
    R=((R (i, j+1)+R (i+2, j+1))/2
    G=G (i+1, j+1)
    B=(B (i+1, j)+B (i+1, j+2))/2

However, in the above mentioned method of interpolating the missing pixels each simply by using an average of pixels around each of the missing pixels, when resolution is less or when dense lines exist within an image, jaggies called as a zipper effect occur, which causes image quality to be degraded. Especially, since a G signal contributes the most to a brightness component, image quality (especially resolution) is largely affected by the fact whether interpolation for the G signal is properly performed or not.

As a technology to solve the problems, there has been known, for instance, a pixel interpolating device in Japanese Patent Laid-Open Publication No. HEI 5-75861.

This pixel interpolating device comprises a binary coding unit for binary-coding each data of the four peripheral pixels located at positions surrounding each of the missing pixels using a prespecified threshold value as a reference. Further, a pixel selecting unit selects the data of two or four peripheral pixels used for computing interpolation data from all combinations of data for the peripheral pixels according to the situation of the binary-coded data for the peripheral pixels. An average value of the peripheral pixel data selected by the pixel selecting unit is determined as the interpolation data of the missing pixel. Namely, average of each data of two or four pixels is determined as the interpolation data according to patterns of each binary-coded data for the four peripheral pixels.

However, the pixel interpolating device in the Japanese Patent Laid-Open Publication No. HEI 5-75861 has a following problems. Namely, when a signal has a low signal level it is largely affected by noise so that correct determination can not be made only with four peripheral pixels. Further, because the binary coding is performed, incorrect determination may cause an image to disadvantageously be more degraded than that in the conventional type of interpolating method.

SUMMARY OF THE INVENTION

This invention has been made in the light of the above problems. It is an object of the present invention to provide, an image processing apparatus and method thereof enabling reproduction of an image with high resolution and smooth outline when interpolation for an image signal is needed.

According to a first aspect of this invention, interpolation signals of a pixel to be interpolated are generated according to each degree of changes in image signals of four adjacent pixels located at positions surrounding the pixel to be interpolated and to each degree of changes in image signals of the pixel to be interpolated. Thus, weighting for pixel interpolation can continuously be changed according to the each degree of changes in image signals of the pixel to be interpolated and each degree of changes in image signals of pixels adjacent to the pixel to be interpolated.

According to a second aspect of this invention, interpolation signals of a pixel to be interpolated are generated according to each degree of changes in image signals of the pixel to be interpolated and a minimum values of each degree of changes in four adjacent pixels located at positions surrounding the pixel to be interpolated in the horizontal direction and vertical direction.

According to a third aspect of this invention, interpolation signals of a pixel to be interpolated are generated according to each degree of changes in image signals of two adjacent pixels located on the two sides of the pixel to be interpolated, each degree of changes in image signals of the pixel to be interpolated, and a difference in degrees between an image signal of each of the adjacent pixels to the pixel to be interpolated in the horizontal direction and each image signal of pixels around the adjacent pixel to the pixel to be interpolated in the horizontal direction.

According to a fourth aspect of this invention, a first computing unit computes each degree of changes in the horizontal direction and vertical direction of image signals of four adjacent pixels located at positions surrounding a pixel to be interpolated, a second computing unit computes each degree of changes in the horizontal direction and vertical direction of image signals of the pixel to be interpolated, a first minimum-value computing unit computes a minimum value of the each degree of changes in the horizontal direction of image signals of the four adjacent pixels located at positions surrounding the pixel to be interpolated computed by the first computing unit, a second minimum-value computing unit computes a minimum value of the each degree of changes in the vertical direction of image signals of the four adjacent pixels located at positions surrounding the pixel to be interpolated computed by the first computing unit, and a interpolation-signal computing unit generates interpolation signals of the pixel to be interpolated each by weighting and averaging pixels in the horizontal direction and pixels in the vertical direction of the four adjacent pixels located at positions surrounding the pixel to be interpolated according to a result of computation in the second computing unit and the minimum values computed by the first and second minimum-value computing unit. Therefore, weighting for pixel interpolation can continuously be changed according to each degree of changes in a pixel to be interpolated as well as to each degree of changes in pixels adjacent to the pixel to be interpolated.

According to a fifth aspect of this invention, a first computing unit computes each degree of changes in the horizontal direction and vertical direction of image signals of two adjacent pixels located on the two sides of a pixel to be interpolated, a second computing unit computes each degree of changes in the horizontal direction and vertical direction of image signals of the pixel to be interpolated, a difference determining unit determines a difference in degrees between an image signal of an adjacent pixel to the pixel to be interpolated in the horizontal direction and each image signal of pixels around the adjacent pixel to the pixel to be interpolated in the horizontal direction, a first minimum-value computing unit computes a minimum value of the each degree of changes in the horizontal direction of image signals of the two adjacent pixels located on the two sides of the pixel to be interpolated computed by the first computing unit, a second minimum-value computing unit computes a minimum value of the each degree of changes in the vertical direction of image signals of the two adjacent pixels located on the two sides of the pixel to be interpolated computed by the first computing unit, a first comparing unit compares the minimum value computed by the first minimum-value computing unit with a first threshold value, a second comparing unit compares the minimum value computed by the second minimum-value computing unit with the first threshold value, a third comparing unit compares each degree of changes in the horizontal direction of image signals of the pixel to be interpolated computed by the second computing unit with a second threshold value, a fourth comparing unit compares each degree of changes in the vertical direction of image signals of the pixel to be interpolated computed by the second computing unit with the second threshold value, a selecting unit selects interpolation constants according to results of comparison in the first to fourth comparing units as well as to a result of determination in the difference determining unit, and a interpolation-signal computing unit generates interpolation signals of the pixel to be interpolated each by weighting and averaging pixels in the horizontal direction and pixels in the vertical direction of the four adjacent pixels located at positions surrounding the pixel to be interpolated according to the interpolation constants selected in the selecting unit.

Other objects and features of this invention will become apparent from the following description with reference to the accompanying drawings.

DESCRIPTION OF THE PREFERRED EMBODIMENTS

Detailed description is made hereinafter for the preferred embodiment of the image forming apparatus and method thereof according to the present invention. First, the configuration of the image processing apparatus will be explained and then the configuration of the brightness-signal interpolating section will be explained with reference to the attached drawings.

Configuration of the Image Processing Apparatus

Figure 1:
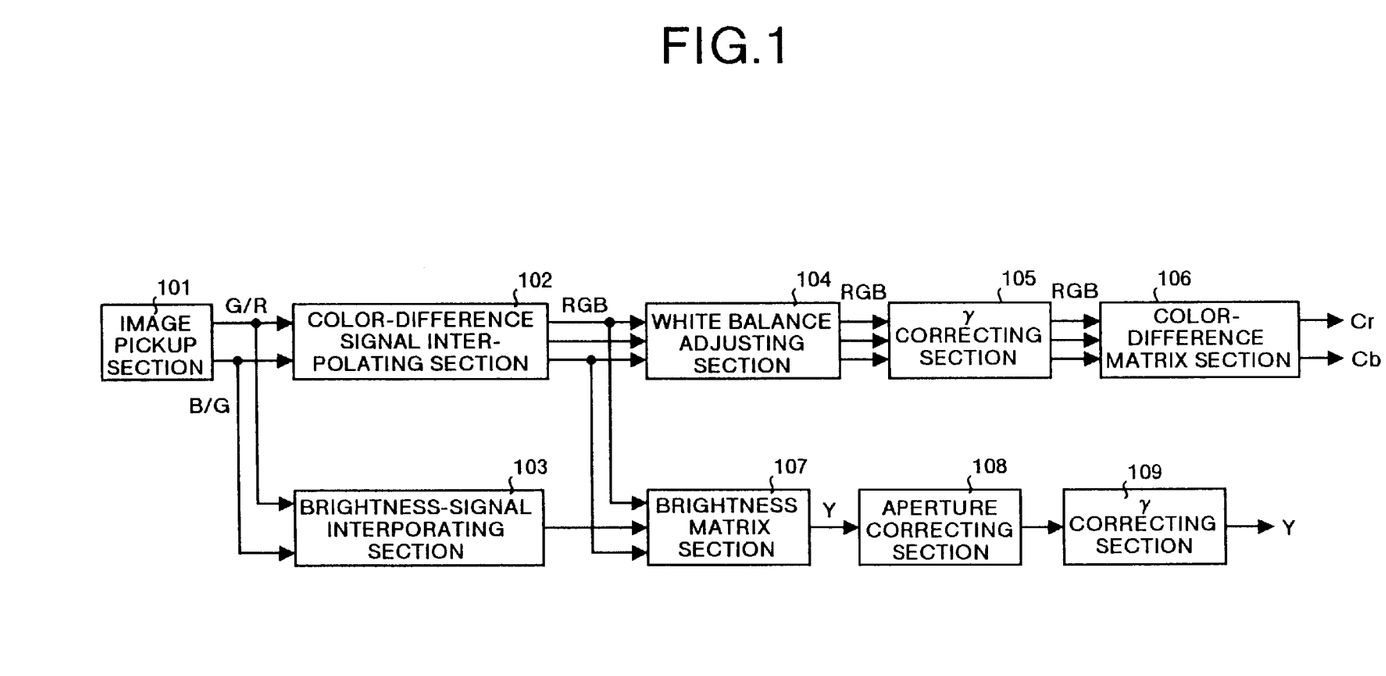
FIG. 1 is a block diagram showing the configuration of an image processing apparatus according to an embodiment of the present invention.

An image processing apparatus according to an embodiment is explained with reference to FIG. 1. FIG. 1 shows a block diagram of the image processing apparatus according to the embodiment of the present invention. The image processing apparatus shown in FIG. 1 comprises an image pickup section 101, a color-difference signal interpolating section 102, a brightness-signal interpolating section 103, a white balance adjusting section 104, a γ-correcting section 105, a color-difference matrix section 106, a brightness matrix section 107, an aperture correcting section 108, and a γ-correcting section 109.

The image pickup section 101 comprises a single-plate color CCD with primary-color filters arranged thereon as explained already with respect to FIG. 4. Thus image pickup section 101 converts the image signals obtained by picking up an image of a subject to RGB signals and outputs the signals to the color-difference signal interpolating section 102 and to the brightness-signal interpolating section 103. In this case, the signals other than the signal of the filter color are missing.

The color-difference signal interpolating section 102 obtained the missing signals of the RGB signals through interpolation, and outputs the interpolated signals of RGB signals to the white balance adjusting section 104 and RB signals to the brightness matrix section 107. More specifically, the color-difference signal interpolating section 102 obtains any of the RGB signals by means of the interpolating method described in the conventional technology, namely obtains a value for the missing pixel simply by using an average of the pixels around the missing pixel (Refer to FIG. 5). Resolution of a color-difference signal is not always required herein, but it is important that RGB have identical frequency characteristics.

The brightness-signal interpolating section 103 subjects a G signal used for generating a brightness signal to interpolation processing and outputs the interpolated G signal to the brightness matrix section 107 although details thereof will be described later.

The white balance adjusting section 104 makes white balance adjustment to the RGB signals input from the color-difference signal interpolating section 102, and outputs the white-balance-adjusted RGB signals to the γ-correcting section 105.

The γ-correcting section 105 subjects the RGB signals input from the white balance adjusting section 104 to γ-conversion, and outputs the γ-converted RGB signals to the color-difference matrix section 106.

The color-difference matrix section 106 converts the RGB signals input from the γ-correcting section 105 to color-difference signals R-Y (Cr) and B-Y (Cb) and outputs these signals.

The brightness matrix section 107 generates a brightness signal Y by using the RB signal interpolated in the color-difference signal interpolating section 102 and the G signal interpolated in the brightness-signal interpolating section 103, and outputs the generated signal to the aperture correcting section 108. When a brightness signal Y is to be generated, the G signal contributes the most to the brightness signal but the RB signals do not contribute much to the signal. Therefore there will be no problem even if the RB signals interpolated by means of the conventional type of interpolating method are used.

The aperture correcting section 108 emphasizes a high-frequency component of the brightness signal Y inputted from the brightness matrix section 107 and outputs the signal. The γ-correcting section 109 subjects the brightness signal Y with its high-frequency component emphasized input from the aperture correcting section 108 to γ-conversion and outputs the γ-converted signal.

Configuration of the Brightness-signal Interpolating Section

Two specific examples of the configuration of the brightness-signal interpolating section 103 are explained below.

EXAMPLE 1

Figure 2:
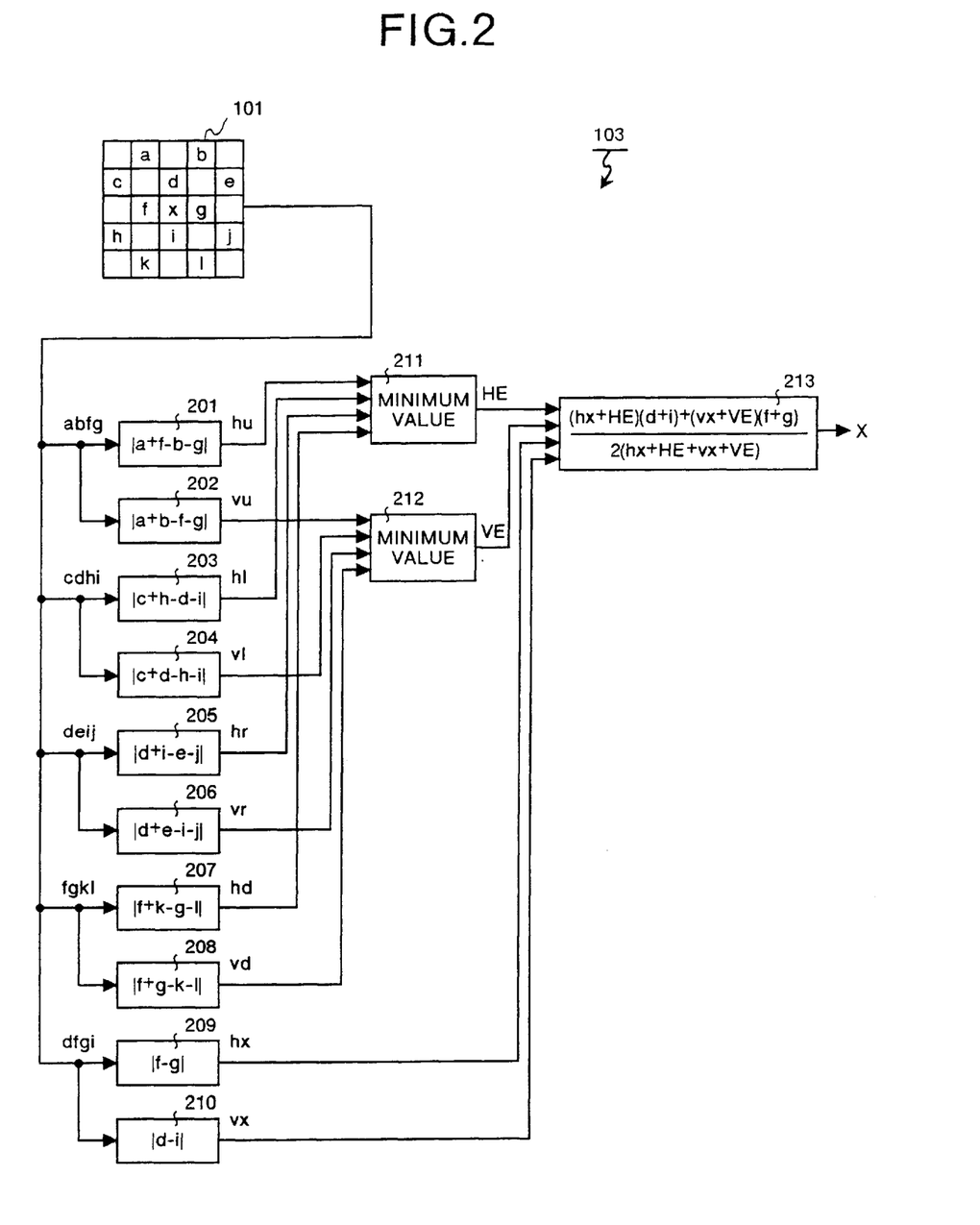
FIG. 2 is a block diagram showing Example 1 of the configuration of the brightness-signal interpolating section shown in FIG. 1.

FIG. 2 is a block diagram showing Example 1 of configuration of the brightness-signal interpolating section 103. The brightness-signal interpolating section 103 shown in FIG. 2 comprises computing sections 201 to 208, minimum value computing sections 211, 212, and a computing section 213. In this figure, a pixel to be obtained through interpolation is represented by x, and pixels having a G color are represented by a to 1.

The computing sections 201 to 210 compute each degree of changes hu, hl, hr, hd in the horizontal direction and each degree of changes vu, vl, vr, vd in the vertical direction of four adjacent pixels d, f, g, and i located at positions surrounding the pixel x with the following equations (1) to (8), and output the each degree of changes hu, hl, hr, hd in the horizontal direction and each degree of changes vu, vl, vr, vd in the vertical direction to the minimum value computing sections 211, 212 respectively.

$$hu = | a + f - b - g | \quad \ldots (1)$$
$$hl = | c + h - d - i | \quad \ldots (2)$$
$$hr = | d + i - e - j | \quad \ldots (3)$$
$$hd = | f + k - g - l | \quad \ldots (4)$$
$$vu = | a + b - f - g | \quad \ldots (5)$$
$$vl = | c + d - h - i | \quad \ldots (6)$$
$$vr = | d + e - i - j | \quad \ldots (7)$$
$$vd = | f + g - k - l | \quad \ldots (8)$$

The computing sections 209, 210 compute a degree of change hx in the horizontal direction and a degree of change vx in the vertical direction of the pixel x with the following equations (9) and (10), and output the results of computations to the computing section 213 respectively.

$$hx = | f - g | \quad \ldots (9)$$
$$vx = | d - i | \quad \ldots (10)$$

The minimum value computing sections 211, 212 compute a minimum value HE of the each degree of changes hu, hl, hr, hd in the horizontal direction and a minimum value VE of the each degree of changes vu, vl, vr, vd in the vertical direction of the four adjacent pixels d, f, g, i each to the pixel x with the following equations (11) and (12), and output the values to the computing section 213 respectively.

$$HE = \min(hu, hl, hr, hd) \quad (11)$$

$$VE = \min(vu, vl, vr, vd) \quad (12)$$

The computing section 213 generates interpolation signals of the pixel x each by weighting and averaging (by changing a mixture ratio) pixels (d+i) in the vertical direction and pixels (f+g) in the horizontal direction of four adjacent pixels d, f, g, and i each to the pixel x with the following equation (13) according to the degree of change hx in the horizontal direction and the degree of change vx in the vertical direction of the pixel x as well as to the minimum value HE of the each degree of changes hu, hl, hr, hd in the horizontal direction and the minimum value VE of the each degree of changes vu, vl, vr, vd in the vertical direction of the four adjacent pixels d, f, g, i each to the pixel x.

$$x = \frac{(hx + HE)(d + i) + (vx + VE)(f + g)}{2(hx + HE + vx + VE)} \quad (13)$$

The computing section 213 also executes similar interpolation with respect to the other missing pixels, and outputs the interpolation signals to the brightness matrix section 107.

As described above, in the brightness-signal interpolating section according to Example 1 of the configuration, interpolation signals of a pixel x are generated according to each degree of changes hu, hl, hr, hd, vu, vl, vr, vd in image signals of four adjacent pixels located at positions surrounding the pixel x as well as to each degree of changes hx, vx in image signals of the pixel x. Therefore, weighting for pixel interpolation can continuously be changed according to each degree of changes in a pixel to be obtained through interpolation as well as to each degree of changes in pixels adjacent to the pixel obtained through interpolation, which allows an image with high resolution and smooth outline to be reproduced.

Further, the brightness-signal interpolating section according to Example 1 generates interpolation signals of the pixel x according to the minimum value HE of the each degree of changes hu, hl, hr, hd in the horizontal direction in image signals of four adjacent pixels d, f, g, and i located at positions surrounding the pixel x, the minimum value VE of the each degree of changes vu, vl, vr, vd in the vertical direction in the image signals of the four adjacent pixels d, f, g, and i located at the positions surrounding the pixel x, and each degree of changes hx, vx in image signals of the pixel x. Therefore, an image with higher resolution and smooth outline can be reproduced.

Further, the brightness-signal interpolating section according to Example 1 determines each degree of changes hu, hl, hr, hd, vu, vl, vr, vd in image signals of four adjacent pixels located at positions surrounding the pixel x in a 3×3 pixel-area around each of the adjacent pixels d, f, g, and i, and determines each degree of changes hx, vx in image signals of the pixel x in a 3×3 pixel-area around the pixel x. Therefore, each degree of changes can be computed with a small amount of computation.

Further, the brightness-signal interpolating section according to Example 1 generates interpolation signals of the pixel x each by using four adjacent pixels d, f, g, and i located at positions surrounding the pixel x. Therefore, interpolation signals of the pixel x can be generated with a small amount of computation.

Further, the brightness-signal interpolating section according to Example 1 generates interpolation signals of the pixel x each by weighting and averaging pixels (f+g) in the horizontal direction and pixels (d+i) in the vertical direction of four adjacent pixels d, f, g, and i located at positions surrounding the pixel x as shown in the equation (13). Therefore, a mixing ratio of adjacent pixels in the horizontal direction and vertical direction can be optimized for computing the interpolation signals of the pixel x.

EXAMPLE 2

Figure 3:
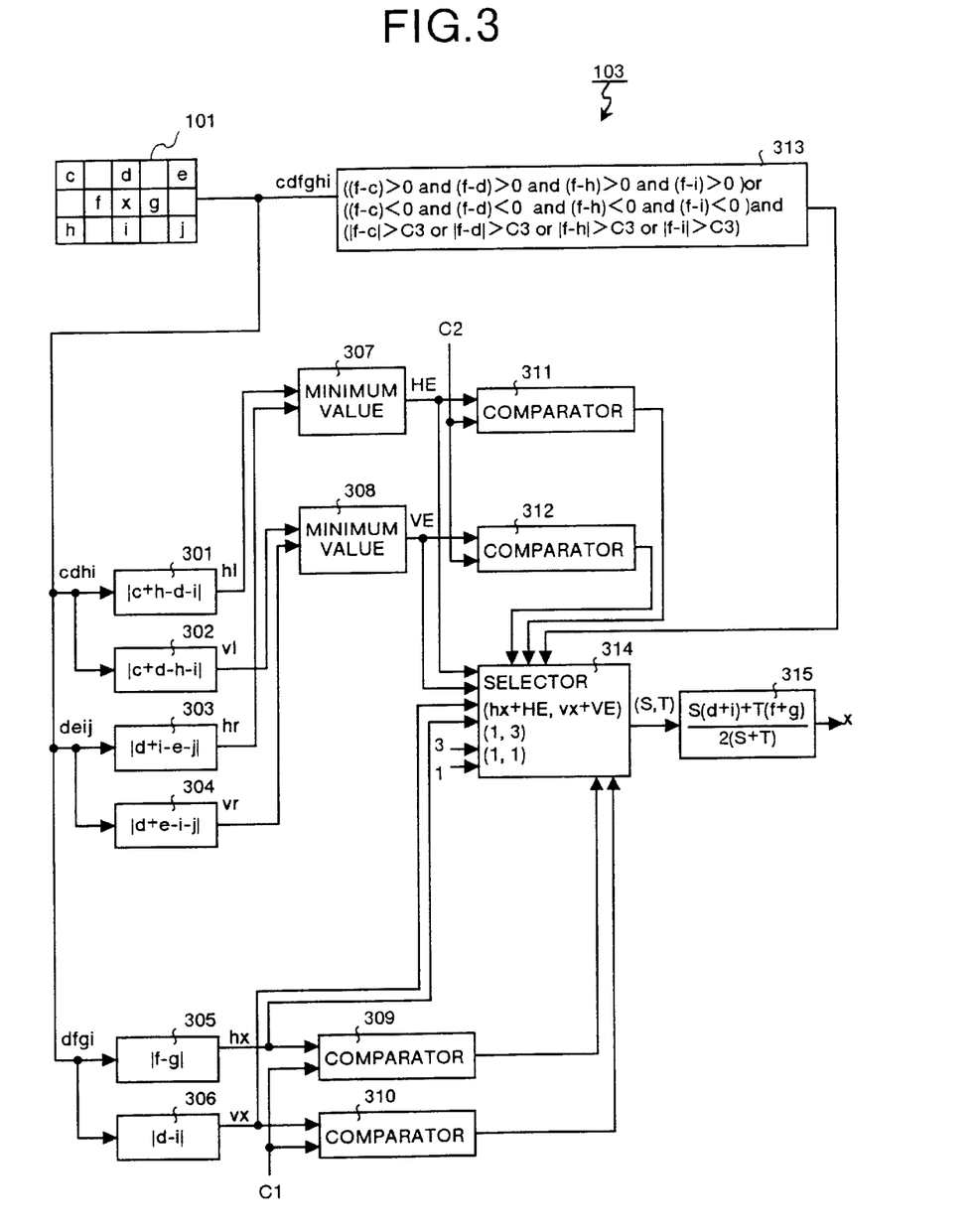
FIG. 3 is a block diagram-showing Example 2 of the configuration of the brightness-signal interpolating section shown in FIG. 1.

FIG. 3 is a block diagram showing Example 2 of the configuration of the brightness-signal interpolating section 103. The brightness-signal interpolating section 103 shown in FIG. 3 comprises computing sections 301 to 306, minimum value computing sections 307, 308, comparators 309 to 312, a computing section 313, a selector 314, and a computing section 315. In this figure, a pixel to be obtained through interpolation is represented by x and the pixels having a G color are represented by c to j.

The computing sections 301 to 304 compute each degree of changes hl, hr in the horizontal direction and each degree of changes vl, vr in the vertical direction of the two adjacent pixels f, g, located on the two sides (in the horizontal direction) of the pixel x with the following equations (14) to (17), and output the each degree of changes hl, hr in the horizontal direction and each degree of changes vl, vr, in the vertical direction to the minimum value computing sections 307, 308 respectively.

$$hl = |c + h - d - i| \quad \ldots (14)$$
$$hr = |d + i - e - j| \quad \ldots (15)$$
$$vl = |c + d - h - i| \quad \ldots (16)$$
$$vr = |d + e - i - j| \quad \ldots (17)$$

The computing sections 305, 306 compute each degree of changes hx, vx in the horizontal direction and in the vertical direction of the pixel x with the following equations (18) and (19), and output each result of computations to the comparators 309, 310, and also to the selector 314 respectively.

$$hx = |f - g| \quad \ldots (18)$$
$$vx = |d - i| \quad \ldots (19)$$

The minimum value computing sections 307, 308 compute a minimum value HE of the each degree of changes hl, hr in the horizontal direction and a minimum value VE of the each degree of changes vl, vr in the vertical direction of the two adjacent pixels f, g located on the two sides of the pixel x with the following equations (20) and (21), and output each result of computations to the comparators 311, 312, and also to the selector 314 respectively.

$$HE = \min(hl, hr) \quad (20)$$
$$VE = \min(vl, vr) \quad (21)$$

The comparator 311 compares an input threshold value C2 with a minimum value HE of each degree of changes hl, hr in the horizontal direction of two adjacent pixels f, g located on the two sides of a pixel x, and outputs a result of comparison ("1" when HE>C2) to the selector 314. The comparator 312 compares the input threshold value C2 with a minimum value VE of each degree of changes vl, vr in the vertical direction of the two adjacent pixels f, g located on the two sides of the pixel x, and outputs a result of comparison ("1" when VE>C2) to the selector 314.

The comparator 309 compares an input threshold value C1 with a degree of change hx in the horizontal direction of the pixel x, and outputs a result of comparison ("1" when hx>C1) to the selector 314. The comparator 310 compares the input threshold value C1 to a degree of change vx in the vertical direction of the pixel x to be interpolated, and outputs a result of comparison ("1" when vx>C1) to the selector 314.

The computing section 313 computes whether (the value of) an adjacent pixel f to the pixel x in the horizontal direction is larger or smaller than pixels c, d, h, and i around the pixel f and whether any of absolute values of each difference between the pixel f and each of the peripheral pixels c, d, h, and i is larger than a threshold value C3 or not through the following equation (22), and outputs results of computation to the selector 314.

$$[((f-c)>0 \text{ and } (f-d)>0 \text{ and } (f-h)>0 \text{ and } (f-i)>0) \text{ or}$$
$$((f-c)<0 \text{ and } (f-d)<0 \text{ and } (f-h)<0 \text{ and } (f-i)<0)] \text{ and}$$
$$[(|f-c|>C3 \text{ or } |f-d|>C3 \text{ or } |f-h|>C3 \text{ or } |f-i|>C3)] \quad (22)$$

The selector 314 selects constants (S, T) used for interpolation processing according to the results of outputs from the comparators 309 to 312 and the computing section 313, and outputs the selected constants to the computing section 315.

More specifically, the selector 314 first outputs (hx+HE, vx+VE) to the computing section 315 as interpolation constants (S, T) when outputs from each of the comparators 309 to 312 is "1", namely satisfies the following equation (23).

$$hx>C1 \text{ and } vx>C1 \text{ and } HE>C2 \text{ and } VE>C2 \quad (23)$$

Furthermore, when the output does not satisfy the equation (23) (when the output is not "1"), the selector 314 then determines whether the output from the computing section 313 is "1" or not. When the output is "1", namely when the output satisfies the equation (22) the selector 314 outputs (1, 3) to the computing section 315 as the interpolation constants (S, T).

When result of outputs from each of the comparators 309 to 312 and the computing section 313 is not "1", namely satisfies neither of the equations (22) and (23), the selector 314 outputs (1, 1) to the computing section 315 as the interpolation constants (S, T).

The computing section 315 computes interpolation signals of the pixel x with the following equation (24) according to the interpolation constants (S, T) input from the selector 314.

$$x = \frac{S(d+i) + T(f+g)}{2(S+T)} \quad (24)$$

More specifically, the computing section 315 computes, when (hx+HE, vx+VE) are inputted from the selector 314 as the interpolation constants (S, T), namely satisfy the equation (23), interpolation signals of the pixel x through computation shown in the following equation (25). This equation (25) is used for obtaining the value of the pixel x through interpolation by weighting and averaging (changing a mixing ratio) pixels (d+i) in the vertical direction and pixels (f+g) in the horizontal direction of the pixel x according to the values hx, vx, HE, and VE.

$$x = \frac{(hx + HE)(d+i) + (vx + VE)(f+g)}{2(hx + HE + vx + VE)} \quad (25)$$

The computing section 315 computes, when (1, 3) are inputted from the selector 314 as interpolation constants (S, T), namely when the equation (23) is not satisfied but the equation (22) is satisfied, interpolation signals of the pixel x through the following equation (26). This equation (26) is used for obtaining the pixel x through interpolation by weighting the pixels (f+g) heavier in the horizontal direction as compared to the pixels (d+i) in the vertical direction of $$x = \frac{(d+i) + 3(f+g)}{8} \quad (26)$$

Further, the computing section 315 computes, when (1, 1) are inputted from the selector 314 as interpolation constants (S, T), namely when neither of the equations (22) and (23) is satisfied, interpolation signals of the pixel x through the following equation (27). This equation (27) is used for obtaining the pixel x through interpolation using the four adjacent pixels d, i, f, and g to the pixel x in the proportions of 1 to 1 thereamong.

$$x = \frac{(d+i) + (f+g)}{4} \quad (27)$$

As described above, with the brightness-signal interpolating section according to Example 2, interpolation signals of the pixel x are generated according to each degree of changes hl, vl, hr, and vr in image signals of two adjacent pixels f, g, located on the two sides of the pixel x, each degree of changes hx, vx in image signals of the pixel x, and a difference in degrees between an image signal of the adjacent pixel f to the pixel x in the horizontal direction and each of image signals of pixels c, d, h, and i around the adjacent pixel f, which allows an image with high resolution and smooth outline to be reproduced. Furthermore, in Example 2 only three lines of pixels in the horizontal direction are used as compared to five lines in Example 1. Therefore, a memory required to store two lines can be reduced as compared to that of the Example 1. A reduction of resolution in the horizontal direction which may occur due to less usable image information in the vertical direction is compensated for by introducing conditions for determination to detect a horizontal line shown in the equation (22).

Further, the brightness-signal interpolating section according to Example 2 generates interpolation signals of the pixel x when a minimum value VE of each degree of changes vl, vr in the vertical direction of two adjacent pixels f, g located on the two sides of the pixel x or a minimum value HE of each degree of changes hl, hr in the horizontal direction of the adjacent pixels f, g is larger than a prespecified threshold value C2 according to each of the minimum values HE and VE. Therefore, an image with higher resolution and smooth outline can be reproduced.

Further, the brightness-signal interpolating section according to Example 2 determines each degree of changes vl, vr, hl, and hr in image signals of two adjacent pixels f, g located on the two sides of a pixel x in a 3×3 pixel-area around each of the adjacent pixels f, g, and determines each degree of changes in image signals of the pixel x in a 3×3 pixel-area around the pixel x. Therefore, each degree of changes can be computed with a small amount of computation.

In addition, the brightness-signal interpolating section according to Example 2 generates interpolation signals of a pixel x, when a minimum value VE of each degree of changes vl, vr in the vertical direction of two adjacent pixels f, g located on the two sides of the pixel x and a minimum value HE of each degree of changes hl, hr in the horizontal direction of the adjacent pixels f, g are equal to or less than a prespecified threshold value C2 and also when each degree of changes hx, vx in image signals of the pixel x are equal to or less than a prespecified threshold value C1, according to whether the adjacent pixel f to the pixel x in the horizontal direction is the maximum or the minimum in a 3×3 pixel-area (c, d, h, i) around the adjacent pixel f. Therefore, an image with higher resolution and smooth outline to be reproduced.

The image processing apparatus according to the present invention is widely applicable to a digital still camera, a digital video camera, or the like.

As described above, according to the first aspect of this invention, interpolation signals of a pixel to be interpolated are generated according to each degree of changes in image signals of four adjacent pixels located at positions surrounding the pixel to be interpolated and to each degree of changes in image signals of the pixel to be interpolated. Thus, weighting for pixel interpolation can continuously be changed according to the each degree of changes in image signals of the Do pixel to be interpolated and each degree of changes in image signals of pixels adjacent to the pixel to be interpolated. Therefore, an image with high resolution and smooth outline can be reproduced.

According to the second aspect of this invention, interpolation signals of a pixel to be interpolated are generated according to each degree of changes in image signals of the pixel to be interpolated and a minimum values of each degree of changes in four adjacent pixels located at positions surrounding the pixel to be interpolated in the horizontal direction and vertical direction. Therefore, an image with higher resolution and smooth outline can be reproduced.

Further each degree of changes in image signals of four adjacent pixels located at positions surrounding the pixel to be interpolated is determined in a 3×3 pixel-area around each of the adjacent pixels, and each degree of changes in image signals of the pixel to be interpolated is determined in a 3×3 pixel-area around the pixel to be interpolated. Therefore, each degree of changes can be computed with a small amount of computation.

According to the third aspect of this invention, interpolation signals of a pixel to be interpolated are generated according to each degree of changes in image signals of two adjacent pixels located on the two sides of the pixel to be interpolated, each degree of changes in image signals of the pixel to be interpolated, and a difference in degrees between an image signal of each of the adjacent pixels to the pixel to be interpolated in the horizontal direction and each image signal of pixels around the adjacent pixel to the pixel to be interpolated in the horizontal direction. Therefore, an image with high resolution and smooth outline can be reproduced based on a small-scale and low-cost circuit configuration.

Further, when a minimum value of each degree of changes in the horizontal direction of two adjacent pixels located on the two sides of the pixel to be interpolated or a minimum value of each degree of changes in the vertical direction of the two adjacent pixels located on the two sides of the pixel to be interpolated is larger than a prespecified threshold value, then the interpolation signals of the pixel to be interpolated are generated according to each of the minimum values. Therefore, an image with higher resolution and having smooth outline can be reproduced.

Further, each degree of changes in image signals of two adjacent pixels located on the two sides of the pixel to be interpolated is determined in a 3×3 pixel-area around each of the adjacent pixels, and each degree of changes in image signals of the pixel to be interpolated is determined in a 3×3 pixel-area around the pixel to be interpolated. Therefore, each degree of changes can be computed with a small amount of computation.

Further, when a minimum value of each degree of changes in the horizontal direction of two adjacent pixels located on the two sides of the pixel to be interpolated or a minimum value of each degree of changes in the vertical direction of the two adjacent pixels located on the two sides of the pixel to be interpolated is equal to or less than a prespecified threshold value, then the interpolation signals of the pixel to be interpolated are generated according to whether image signals of each of the adjacent pixels to the pixel to be interpolated in the horizontal direction is the maximum or the minimum in a 3×3 pixel-area around the adjacent pixel to the pixel to be interpolated in the horizontal direction. Therefore, an image with higher resolution and having smooth outline can be reproduced.

Further, interpolation signals of the pixel to be interpolated are generated each by using four adjacent pixels located at positions surrounding the pixel to be interpolated. Therefore, interpolation signals of the pixel to be interpolated can be generated with a small amount of computation.

Further, interpolation signals of the pixel to be interpolated are generated each by weighting and averaging pixels in the horizontal direction and pixels in the vertical direction of four adjacent pixels located at positions surrounding the pixel to be interpolated. Therefore, a mixing ratio of adjacent pixels in the horizontal direction and vertical direction can be optimized for computing the interpolation signals of the pixel to be interpolated.

According to the forth aspect of this invention, the first computing unit computes each degree of changes in the horizontal direction and vertical direction of image signals of four adjacent pixels located at positions surrounding a pixel to be interpolated, the second computing unit computes each degree of changes in the horizontal direction and vertical direction of image signals of the pixel to be interpolated, the first minimum-value computing unit computes a minimum value of the each degree of changes in the horizontal direction of image signals of the four adjacent pixels located at positions surrounding the pixel to be interpolated computed by the first computing unit, the second minimum-value computing unit computes a minimum value of the each degree of changes in the vertical direction of image signals of the four adjacent pixels located at positions surrounding the pixel to be interpolated computed by the first computing unit, and the interpolation-signal computing unit generates interpolation signals of the pixel to be interpolated each by weighting and averaging pixels in the horizontal direction and pixels in the vertical direction of the four adjacent pixels located at positions surrounding the pixel to be interpolated according to a result of computation in the second computing unit and the minimum values computed by the first and second minimum-value computing unit. Therefore, weighting for pixel interpolation can continuously be changed according to each degree of changes in a pixel to be interpolated as well as to each degree of changes in pixels adjacent to the pixel to be interpolated, which allows an image with high resolution and having smooth outline to be reproduced.

According to the fifth aspect of this invention, the first computing unit computes each degree of changes in the horizontal direction and vertical direction of image signals of two adjacent pixels located on the two sides of a pixel to be interpolated, the second computing unit computes each degree of changes in the horizontal direction and vertical direction of image signals of the pixel to be interpolated, the difference determining unit determines a difference in degrees between an image signal of an adjacent pixel to the pixel to be interpolated in the horizontal direction and each image signal of pixels around the adjacent pixel to the pixel to be interpolated in the horizontal direction, the first minimum-value computing unit computes a minimum value of the each degree of changes in the horizontal direction of image signals of the two adjacent pixels located on the two sides of the pixel to be interpolated computed by the first computing unit, the second minimum-value computing unit computes a minimum value of the each degree of changes in the vertical direction of image signals of the two adjacent pixels located on the two sides of the pixel to be interpolated computed by the first computing unit, the first comparing unit compares the minimum value computed by the first minimum-value computing unit with a first threshold value, the second comparing unit compares the minimum value computed by the second minimum-value computing unit with the first threshold value, the third comparing unit compares each degree of changes in the horizontal direction of image signals of the pixel to be interpolated computed by the second computing unit with a second threshold value, the fourth comparing unit compares each degree of changes in the vertical direction of image signals of the pixel to be interpolated computed by the second computing unit with the second threshold value, the selecting unit selects interpolation constants according to results of comparison in the first to fourth comparing units as well as to a result of determination in the difference determining unit, and the interpolation-signal computing unit generates interpolation signals of the pixel to be interpolated each by weighting and averaging pixels in the horizontal direction and pixels in the vertical direction of the four adjacent pixels located at positions surrounding the pixel to be interpolated according to the interpolation constants selected in the selecting unit. Therefore, an image with high resolution and smooth outline can be reproduced based on a small-scale and low-cost circuit configuration.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image processing apparatus configured to process pixels having missing image signals by interpolation, said pixels being arranged in a grid configuration wherein each pixel is between other pixels in a horizontal direction and a vertical direction, said other pixels having image signals corresponding to said missing image signals, said apparatus comprising:

an interpolating unit configured to generate interpolation signals of a pixel to be interpolated according to each degree of changes in image signals of four adjacent pixels located at positions surrounding said pixel to be interpolated, and according to each degree of changes in image signals of said pixel to be interpolated, wherein:

each degree of changes is determined by determining a difference between at least two pixels adjacent to the pixel for which the degree of change is determined, and said each degree of changes in image signals of the four adjacent pixels is determined by determining a difference between at least two pixels of the same color as the adjacent pixel for which the degree of change is determined.

2. The image processing apparatus according to claim 1, wherein said interpolating unit is configured to determine each degree of changes in image signals of the four adjacent pixels located at positions surrounding said pixel to be interpolated in a 3×3 pixel-area around each of the adjacent pixels, and to determine each degree of changes in image signals of said pixel to be interpolated in a 3×3 pixel-area around said pixel to be interpolated.

3. The image processing apparatus according to claim 1, wherein said interpolating unit is configured to generate interpolation signals of said pixel to be interpolated by using said four adjacent pixels located at positions surrounding said pixel to be interpolated.

4. The image processing apparatus according to claim 1, wherein said interpolating unit is configured to generate interpolation signals of said pixel to be interpolated by weighting and averaging pixels in the horizontal direction and pixels in the vertical direction of said four adjacent pixels located at positions surrounding said pixel to be interpolated.

5. An image processing apparatus configured to process pixels having missing image signals by interpolation, said pixels being arranged in a grid configuration wherein each pixel is between other pixels in a horizontal direction and a vertical direction, said other pixels having image signals corresponding to said missing image signals, said apparatus comprising:

an interpolating unit configured to generate interpolation signals of a pixel to be interpolated according to each degree of changes in image signals of said pixel to be interpolated and according to a minimum value of each degree of changes in four adjacent pixels located at positions surrounding said pixel to be interpolated in the horizontal direction and vertical direction, wherein:

each degree of changes is determined by determining a difference between at least two pixels adjacent to the pixel for which the degree of change is determined, and said each degree of changes in image signals of the four adjacent pixels is determined by determining a difference between at least two pixels of the same color as the adjacent pixel for which the degree of change is determined.

6. The image processing apparatus according to claim 5, wherein said interpolating unit is configured to determine each degree of changes in image signals of the four adjacent pixels located at positions surrounding said pixel to be interpolated in a 3×3 pixel-area around each of the adjacent pixels, and to determine each degree of changes in image signals of said pixel to be interpolated in a 3×3 pixel-area around said pixel to be interpolated.

7. The image processing apparatus according to claim 5, wherein said interpolating unit is configured to generate interpolation signals of said pixel to be interpolated by using said four adjacent pixels located at positions surrounding said pixel to be interpolated.

8. The image processing apparatus according to claim 5, wherein said interpolating unit is configured to generate interpolation signals of said pixel to be interpolated by weighting and averaging pixels in the horizontal direction and pixels in the vertical direction of said four adjacent pixels located at positions surrounding said pixel to be interpolated.

9. An image processing apparatus configured to process pixels having missing image signals by interpolation, said pixels being arranged in a grid configuration wherein each pixel is between other pixels in a horizontal direction and a vertical direction, said other pixels having image signals corresponding to said missing image signals, said apparatus comprising:

an interpolating unit configured to generate interpolation signals of a pixel to be interpolated according to each degree of changes in image signals of two adjacent pixels located on each of two sides of said pixel to be interpolated, according to each degree of changes in image signals of said pixel to be interpolated, and according to a difference in degrees between an image signal of each of the adjacent pixels to said pixel to be interpolated in the horizontal direction and each image signal of pixels around the adjacent pixel to said pixel to be interpolated in the horizontal direction.

10. The image processing apparatus according to claim 9, wherein said interpolating unit is configured to generate interpolation signals of said pixel to be interpolated, when one of a minimum value of each degree of changes in the horizontal direction of the two adjacent pixels located on the two sides of said pixel to be interpolated and a minimum value of each degree of changes in the vertical direction of the two adjacent pixels located on the two sides of said pixel to be interpolated is larger than a prespecified threshold value, according to each of the minimum values.

11. The image processing apparatus according to claim 9, wherein said interpolating unit is configured to determine each degree of changes in image signals of two adjacent pixels located on the two sides of said pixel to be interpolated in a 3×3 pixel-area around each of the adjacent pixels, and to determine each degree of changes in image signals of said pixel to be interpolated in a 3×3 pixel-area around said pixel to be interpolated.

12. The image processing apparatus according to claim 9, wherein said interpolating unit is configured to generate interpolation signals of said pixel to be interpolated, when one of a minimum value of each degree of changes in the horizontal direction of the two adjacent pixels located on the two sides of said pixel to be interpolated and a minimum value of each degree of changes in the vertical direction of the two adjacent pixels located on the two sides of said pixel to be interpolated is equal to or less than a prespecified threshold value, according to whether an image signal of each of the adjacent pixels to said pixel to be interpolated in the horizontal direction is a maximum signal or a minimum signal in a 3×3 pixel-area around the adjacent pixel to said pixel to be interpolated in the horizontal direction.

13. The image processing apparatus according to claim 9, wherein said interpolating unit is configured to generate interpolation signals of said pixel to be interpolated by using four adjacent pixels located at positions surrounding said pixel to be interpolated.

14. The image processing apparatus according to claim 9, wherein said interpolating unit is configured to generate interpolation signals of said pixel to be interpolated by weighting and averaging pixels in the horizontal direction and pixels in the vertical direction of four adjacent pixels located at positions surrounding said pixel to be interpolated.

15. An image processing apparatus configured to process pixels having missing image signals by interpolation, said pixels being arranged in a grid configuration wherein each pixel is between other pixels in a horizontal direction and a vertical direction, said other pixels having image signals corresponding to said missing image signals, said apparatus comprising:
- a first computing unit configured to compute each degree of changes in the horizontal direction and vertical direction of image signals of four adjacent pixels located at positions surrounding a pixel to be interpolated;
- a second computing unit configured to compute each degree of changes in the horizontal direction and vertical direction of image signals of said pixel to be interpolated;
- a first minimum-value computing unit configured to compute a minimum value of the degrees of changes in the horizontal direction of image signals of the four adjacent pixels located at positions surrounding said pixel to be interpolated computed by said first computing unit;
- a second minimum-value computing unit configured to compute a minimum value of the degrees of changes in the vertical direction of image signals of the four adjacent pixels located at positions surrounding said pixel to be interpolated computed by said first computing unit; and
- an interpolation-signal computing unit configured to generate the interpolation signals of said pixel to be interpolated by weighting and averaging pixels in the horizontal direction and pixels in the vertical direction of the four adjacent pixels located at positions surrounding said pixel to be interpolated according to a result of computation in said second computing unit and according to the minimum values computed by said first and second minimum-value computing units, wherein:
  - each degree of changes is determined by determining a difference between at least two pixels adjacent to the pixel for which the degree of change is determined, and
  - said each degree of changes in image signals of the four adjacent pixels is determined by determining a difference between at least two pixels of the same color as the adjacent pixel for which the degree of change is determined.

16. An image processing apparatus configured to process pixels having missing image signals by interpolation, said pixels being arranged in a grid configuration wherein each pixel is between other pixels in a horizontal direction and a vertical direction, said other pixels having image signals corresponding to said missing image signals, said apparatus comprising:
- a first computing unit configured to compute each degree of changes in the horizontal direction and vertical direction of image signals of two adjacent pixels located on each of two sides of a pixel to be interpolated;
- a second computing unit configured to compute each degree of changes in the horizontal direction and vertical direction of image signals of said pixel to be interpolated;
- a difference determining unit configured to obtain a difference in degrees between an image signal of an adjacent pixel to said pixel to be interpolated in the horizontal direction and each image signal of pixels around the adjacent pixel to said pixel to be interpolated in the horizontal direction;
- a first minimum-value computing unit configured to compute a minimum value of the degrees of changes in the horizontal direction of image signals of the two adjacent pixels located on the two sides of said pixel to be interpolated computed by said first computing unit;
- a second minimum-value computing unit configured to compute a minimum value of the degrees of changes in the vertical direction of image signals of the two adjacent pixels located on the two sides of said pixel to be interpolated computed by said first computing unit;
- a first comparing unit configured to compare the minimum value computed by said first minimum-value computing unit with a first threshold value;
- a second comparing unit configured to compare the minimum value computed by said second minimum-value computing unit with the first threshold value;
- a third comparing unit configured to compare each degree of changes in the horizontal direction of image signals of said pixel to be interpolated computed by said second computing unit with a second threshold value;
- a fourth comparing unit configured to compare each degree of changes in the vertical direction of image signals of said pixel to be interpolated computed by said second computing unit with the second threshold value;
- a selecting unit configured to select interpolation constants according to results of comparison in said first to fourth comparing units and a result of determination in said difference determining unit; and
- an interpolation-signal computing unit configured to generate interpolation signals of said pixel to be interpolated by weighting and averaging pixels in the horizontal direction and pixels in the vertical direction of the four adjacent pixels located at positions surrounding said pixel to be interpolated according to the interpolation constants selected by said selecting unit.

17. An image processing apparatus configured to process pixels having missing image signals by interpolation, said pixels being arranged in a grid configuration wherein each pixel is between other pixels in a horizontal direction and a vertical direction, said other pixels having image signals corresponding to said missing image signals, said apparatus comprising:
- an image pickup section including said pixels; and
- an interpolating means for generating interpolation signals of a pixel to be interpolated according to each degree of changes in image signals of four adjacent pixels located at positions surrounding said pixel to be interpolated, and according to each degree of changes in image signals of said pixel to be interpolated, wherein:

each degree of changes is determined by determining a difference between at least two pixels adjacent to the pixel for which the degree of change is determined, and said each degree of changes in image signals of the four adjacent pixels is determined by determining a difference between at least two pixels of the same color as the adjacent pixel for which the degree of change is determined.

18. The image processing apparatus according to claim 17, wherein said interpolating means is configured to determine each degree of changes in image signals of four adjacent pixels located at positions surrounding said pixel to be interpolated in a 3×3 pixel-area around each of the adjacent pixels, and to determine each degree of changes in image signals of said pixel to be interpolated in a 3×3 pixel-area around said pixel to be interpolated.

19. The image processing apparatus according to claim 17, wherein said interpolating means is configured to generate interpolation signals of said pixel to be interpolated by using four adjacent pixels located at positions surrounding said pixel to be interpolated.

20. The image processing apparatus according to claim 17, wherein said interpolating means is configured to generate interpolation signals of said pixel to be interpolated by weighting and averaging pixels in the horizontal direction and pixels in the vertical direction of four adjacent pixels located at positions surrounding said pixel to be interpolated.

21. An image processing apparatus configured to process pixels having missing image signals by interpolation, said pixels being arranged in a grid configuration wherein each pixel is between other pixels in a horizontal direction and a vertical direction, said other pixels having image signals corresponding to said missing image signals, said apparatus comprising:

an image pickup section including said pixels; and an interpolating means for generating interpolation signals of a pixel to be interpolated according to each degree of changes in image signals of said pixel to be interpolated and according to a minimum value of each degree of changes in four adjacent pixels located at positions surrounding said pixel to be interpolated in the horizontal direction and vertical direction, wherein:

each degree of changes is determined by determining a difference between at least two pixels adjacent to the pixel for which the degree of change is determined and said each degree of changes in image signals of the four adjacent pixels is determined by determining a difference between at least two pixels of the same color as the adjacent pixel for which the degree of change is determined.

22. The image processing apparatus according to claim 21, wherein said interpolating means is configured to determine each degree of changes in image signals of four adjacent pixels located at positions surrounding said pixel to be interpolated in a 3×3 pixel-area around each of the adjacent pixels, and to determine each degree of changes in image signals of said pixel to be interpolated in a 3×3 pixel-area around said pixel to be interpolated.

23. The image processing apparatus according to claim 21, wherein said interpolating means is configured to generate interpolation signals of said pixel to be interpolated by using four adjacent pixels located at positions surrounding said pixel to be interpolated.

24. The image processing apparatus according to claim 21, wherein said interpolating means is configured to generate interpolation signals of said pixel to be interpolated by weighting and averaging pixels in the horizontal direction and pixels in the vertical direction of four adjacent pixels located at positions surrounding said pixel to be interpolated.

25. An image processing apparatus configured to process pixels having missing image signals by interpolation, said pixels being arranged in a grid configuration wherein each pixel is between other pixels in a horizontal direction and a vertical direction, said other pixels having image signals corresponding to said missing image signals, said apparatus comprising:

an image pickup section including said pixels; and an interpolating means for generating interpolation signals of a pixel to be interpolated according to each degree of changes in image signals of two adjacent pixels located on each of two sides of said pixel to be interpolated, according to each degree of changes in image signals of said pixel to be interpolated, and according to a difference in degrees between an image signal of each of the adjacent pixels to said pixel to be interpolated in the horizontal direction and each image signal of pixels around the adjacent pixel to said pixel to be interpolated in the horizontal direction.

26. The image processing apparatus according to claim 25, wherein said interpolating means is configured to generate interpolation signals of said pixel to be interpolated, when one of a minimum value of each degree of changes in the horizontal direction of the two adjacent pixels located on the two sides of said pixel to be interpolated and a minimum value of each degree of changes in the vertical direction of the two adjacent pixels located on the two sides of said pixel to be interpolated is larger than a prespecified threshold value, according to each of the minimum values.

27. The image processing apparatus according to claim 25, wherein said interpolating means is configured to determine each degree of changes in image signals of two adjacent pixels located on the two sides of said pixel to be interpolated in a 3×3 pixel-area around each of the adjacent pixels, and to determine each degree of changes in image signals of said pixel to be interpolated in a 3×3 pixel-area around said pixel to be interpolated.

28. The image processing apparatus according to claim 25, wherein said interpolating means is configured to generate interpolation signals of said pixel to be interpolated, when one of a minimum value of each degree of changes in the horizontal direction of two adjacent pixels located on the two sides of said pixel to be interpolated and a minimum value of each degree of changes in the vertical direction of the two adjacent pixels located on the two sides of said pixel to be interpolated is equal to or less than a prespecified threshold value, according to whether an image signal of each of the adjacent pixels to said pixel to be interpolated in the horizontal direction is a maximum signal or a minimum signal in a 3×3 pixel-area around the adjacent pixel to said pixel to be interpolated in the horizontal direction.

29. The image processing apparatus according to claim 25, wherein said interpolating means is configured to generate interpolation signals of said pixel to be interpolated by using four adjacent pixels located at positions surrounding said pixel to be interpolated.

30. The image processing apparatus according to claim 25, wherein said interpolating means is configured to generate interpolation signals of said pixel to be interpolated by weighting and averaging pixels in the horizontal direction and pixels in the vertical direction of four adjacent pixels located at positions surrounding said pixel to be interpolated.

31. An image processing apparatus configured to process pixels having missing image signals by interpolation, said pixels being arranged in a grid configuration wherein each pixel is between other pixels in a horizontal direction and a vertical direction, said other pixels having image signals corresponding to said missing image signals, said apparatus comprising:
- a first computing means for computing each degree of changes in the horizontal direction and vertical direction of image signals of four adjacent pixels located at positions surrounding a pixel to be interpolated;
- a second computing means for computing each degree of changes in the horizontal direction and vertical direction of image signals of said pixel to be interpolated;
- a first minimum-value computing means for computing a minimum value of the degrees of changes in the horizontal direction of image signals of the four adjacent pixels located at positions surrounding said pixel to be interpolated computed by said first computing means;
- a second minimum-value computing means for computing a minimum value of the degrees of changes in the vertical direction of image signals of the four adjacent pixels located at positions surrounding said pixel to be interpolated computed by said first computing means; and
- an interpolation-signal computing means for generating the interpolation signals of said pixel to be interpolated by weighting and averaging pixels in the horizontal direction and pixels in the vertical direction of the four adjacent pixels located at positions surrounding said pixel to be interpolated according to a result of computation in said second computing means and the minimum values computed by said first and second minimum-value computing means, wherein:
  - each degree of changes is determined by determining a difference between at least two pixels adjacent to the pixel for which the degree of change is determined, and
  - said each degree of changes in image signals of the four adjacent pixels is determined by determining a difference between at least two pixels of the same color as the adjacent pixel for which the degree of change is determined.

32. An image processing apparatus configured to process pixels having missing image signals by interpolation, said pixels being arranged in a grid configuration wherein each pixel is between other pixels in a horizontal direction and a vertical direction, said other pixels having image signals corresponding to said missing image signals, said apparatus comprising:
- a first computing means for computing each degree of changes in the horizontal direction and vertical direction of image signals of two adjacent pixels located on each of two sides of a pixel to be interpolated;
- a second computing means for computing each degree of changes in the horizontal direction and vertical direction of image signals of said pixel to be interpolated;
- a difference determining means for obtaining difference in degrees between an image signal of an adjacent pixel to said pixel to be interpolated in the horizontal direction and each image signal of pixels around the adjacent pixel to said pixel to be interpolated in the horizontal direction;
- a first minimum-value computing means for computing a minimum value of the degrees of changes in the horizontal direction of image signals of the two adjacent pixels located on the two sides of said pixel to be interpolated computed by said first computing means;
- a second minimum-value computing means for computing a minimum value of the degrees of changes in the vertical direction of image signals of the two adjacent pixels located on the two sides of said pixel to be interpolated computed by said first computing means;
- a first comparing means for comparing the minimum value computed by said first minimum-value computing means with a first threshold value;
- a second comparing means for comparing the minimum value computed by said second minimum-value computing means with the first threshold value;
- a third comparing means for comparing each degree of changes in the horizontal direction of image signals of said pixel to be interpolated computed by said second computing means with a second threshold value;
- a fourth comparing means for comparing each degree of changes in the vertical direction of image signals of said pixel to be interpolated computed by said second computing means with the second threshold value;
- a selecting means for selecting interpolation constants according to results of comparison in said first to fourth comparing means and a result of determination in said difference determining means; and
- an interpolation-signal computing means for generating interpolation signals of said pixel to be interpolated by weighting and averaging pixels in the horizontal direction and pixels in the vertical direction of the four adjacent pixels located at positions surrounding said pixel to be interpolated according to the interpolation constants selected by said selecting means.

33. An image processing method for processing pixels having missing image signals by interpolation, said pixels being arranged in a grid configuration wherein each pixel is between other pixels in a horizontal direction and a vertical direction, said other pixels having image signals corresponding to said missing image signals, said method comprising:
- generating interpolation signals of a pixel to be interpolated according to each degree of changes in image signals of four adjacent pixels located at positions surrounding said pixel to be interpolated, and according to each degree of changes in image signals of said pixel to be interpolated, wherein:
  - each degree of changes is determined by determining a difference between at least two pixels adjacent to the pixel for which the degree of change is determined, and
  - said each degree of changes in image signals of the four adjacent pixels is determined by determining a difference between at least two pixels of the same color as the adjacent pixel for which the degree of change is determined.

34. The image processing method according to claim 33, wherein said generating step determines each degree of changes in image signals of four adjacent pixels located at positions surrounding said pixel to be interpolated in a 3×3 pixel-area around each of the adjacent pixels, and determines each degree of changes in image signals of said pixel to be interpolated in a 3×3 pixel-area around said pixel to be interpolated.

35. The image processing method according to claim 33, wherein said generating step generates interpolation signals of said pixel to be interpolated by using four adjacent pixels located at positions surrounding said pixel to be interpolated.

36. The image processing method according to claim 33, wherein said generating step generates interpolation signals of said pixel to be interpolated by weighting and averaging pixels in the horizontal direction and pixels in the vertical direction of four adjacent pixels located at positions surrounding said pixel to be interpolated.

37. An image processing method for processing pixels having missing image signals by interpolation, said pixels being arranged in a grid configuration wherein each pixel is between other pixels in a horizontal direction and a vertical direction, said other pixels having image signals corresponding to said missing image signals, said method comprising:

generating interpolation signals of a pixel to be interpolated according to each degree of changes in image signals of said pixel to be interpolated and minimum values of each degree of changes in four adjacent pixels located at positions surrounding said pixel to be interpolated in the horizontal direction and vertical direction, wherein:

each degree of changes is determined by determining a difference between at least two pixels adjacent to the pixel for which the degree of change is determined, and said each degree of changes in image signals of the four adjacent pixels is determined by determining a difference between at least two pixels of the same color as the adjacent pixel for which the degree of change is determined.

38. The image processing method according to claim 37, wherein said generating step determines each degree of changes in image signals of four adjacent pixels located at positions surrounding said pixel to be interpolated in a 3×3 pixel-area around each of the adjacent pixels, and determines each degree of changes in image signals of said pixel to be interpolated in a 3×3 pixel-area around said pixel to be interpolated.

39. The image processing method according to claim 37, wherein said generating step generates interpolation signals of said pixel to be interpolated by using four adjacent pixels located at positions surrounding said pixel to be interpolated.

40. The image processing method according to claim 37, wherein said generating step generates interpolation signals of said pixel to be interpolated by weighting and averaging pixels in the horizontal direction and pixels in the vertical direction of four adjacent pixels located at positions surrounding said pixel to be interpolated.

41. An image processing method for processing pixels having missing image signals by interpolation, said pixels being arranged in a grid configuration wherein each pixel is between other pixels in a horizontal direction and a vertical direction, said other pixels having image signals corresponding to said missing image signals, said method comprising:

generating interpolation signals of a pixel to be interpolated according to each degree of changes in image signals of two adjacent pixels located on each of two sides of said pixel to be interpolated, according to each degree of changes in image signals of said pixel to be interpolated, and according to a difference in degrees between an image signal of each of the adjacent pixels to said pixel to be interpolated in the horizontal direction and each image signal of pixels around the adjacent pixel to said pixel to be interpolated in the horizontal direction.

42. The image processing method according to claim 41, wherein said generating step generates interpolation signals of said pixel to be interpolated, when one of a minimum value of each degree of changes in the horizontal direction of two adjacent pixels located on the two sides of said pixel to be interpolated and a minimum value of each degree of changes in the vertical direction of the two adjacent pixels located on the two sides of said pixel to be interpolated is larger than a prespecified threshold value, according to each of the minimum values.

43. The image processing method according to claim 41, wherein said generating step determines each degree of changes in image signals of two adjacent pixels located on the two sides of said pixel to be interpolated in a 3×3 pixel-area around each of the adjacent pixels, and determines each degree of changes in image signals of said pixel to be interpolated in a 3×3 pixel-area around said pixel to be interpolated.

44. The image processing method according to claim 41, wherein said generating step generates interpolation signals of said pixel to be interpolated, when one of a minimum value of each degree of changes in the horizontal direction of two adjacent pixels located on the two sides of said pixel to be interpolated and a minimum value of each degree of changes in the vertical direction of the two adjacent pixels located on the two sides of said pixel to be interpolated is equal to or less than a prespecified threshold value, according to whether an image signal of each of the adjacent pixels to said pixel to be interpolated in the horizontal direction is a maximum signal or a minimum signal in a 3×3 pixel-area around the adjacent pixel to said pixel to be interpolated in the horizontal direction.

45. The image processing method according to claim 41, wherein said generating step generates interpolation signals of said pixel to be interpolated by using four adjacent pixels located at positions surrounding said pixel to be interpolated.

46. The image processing method according to claim 41, wherein said generating step generates interpolation signals of said pixel to be interpolated by weighting and averaging pixels in the horizontal direction and pixels in the vertical direction of four adjacent pixels located at positions surrounding said pixel to be interpolated.

47. An image processing method for processing pixels having missing image signals by interpolation, said pixels being arranged in a grid configuration wherein each pixel is between other pixels in a horizontal direction and a vertical direction, said other pixels having image signals corresponding to said missing image signals said method comprising:

a first computing step for computing each degree of changes in the horizontal direction and vertical direction of image signals of four adjacent pixels located at positions surrounding a pixel to be interpolated;

a second computing step for computing each degree of changes in the horizontal direction and vertical direction of image signals of said pixel to be interpolated; a first minimum-value computing step for computing a minimum value of the each degree of changes in the horizontal direction of image signals of the four adjacent pixels located at positions surrounding said pixel to be interpolated computed by said first computing step;

a second minimum-value computing step for computing a minimum value of the each degree of changes in the vertical direction of image signals of the four adjacent pixels located at positions surrounding said pixel to be interpolated computed by said first computing step; and generating the interpolation signals of said pixel to be interpolated by weighting and averaging pixels in the horizontal direction and pixels in the vertical direction of the four adjacent pixels located at positions surrounding said pixel to be interpolated according to a result of computation in said second computing step and the minimum values computed by said first and second minimum-value computing steps, wherein:

each degree of changes is determined by determining a difference between at least two pixels adjacent to the pixel for which the degree of change is determined, and said each degree of changes in image signals of the four adjacent pixels is determined by determining a difference between at least two pixels of the same color as the adjacent pixel for which the degree of change is determined.

48. An image processing method for processing pixels having missing image signals by interpolation, said pixels being arranged in a grid configuration wherein said pixel is between other pixels in a horizontal direction and a vertical direction, said other pixels having image signals corresponding to said missing image signals, said method comprising:

a first computing step for computing each degree of changes in the horizontal direction and vertical direction of image signals of two adjacent pixels located on the two sides of a pixel to be interpolated;

a second computing step for computing each degree of changes in the horizontal direction and vertical direction of image signals of said pixel to be interpolated;

a difference determining step for obtaining a difference in degrees between an image signal of an adjacent pixel to said pixel to be interpolated in the horizontal direction and each image signal of pixels around the adjacent pixel to said pixel to be interpolated in the horizontal direction;

a first minimum-value computing step for computing a minimum value of the each degree of changes in the horizontal direction of image signals of the two adjacent pixels located on the two sides of said pixel to be interpolated computed by said first computing step;

a second minimum-value computing step for computing a minimum value of the each degree of changes in the vertical direction of image signals of the two adjacent pixels located on the two sides of said pixel to be interpolated computed by said first computing step;

a first comparing step for comparing the minimum value computed by said first minimum-value computing step with a first threshold value;

a second comparing step for comparing the minimum value computed by said second minimum-value computing step with the first threshold value;

a third comparing step for comparing each degree of changes in the horizontal direction of image signals of said pixel to be interpolated computed by said second computing step with a second threshold value;

a fourth comparing step for comparing each degree of changes in the vertical direction of image signals of said pixel to be interpolated computed by said second computing step with the second threshold value;

selecting interpolation constants according to results of comparison in said first to fourth comparing steps and a result of determination in said difference determining step; and generating interpolation signals of said pixel to be interpolated each by weighting and averaging pixels in the horizontal direction and pixels in the vertical direction of the four adjacent pixels located at positions surrounding said pixel to be interpolated according to the interpolation constants selected by said selecting step.

49. In an image processing apparatus configured to process a plurality of pixels arranged in a grid configuration, wherein each pixel has a defined image signal and a plurality of undefined image signals, each pixel to be processed being adjacent to other pixels having defined image signals corresponding to the undefined image signals of the pixel to be processed, the improvement comprising:

an interpolating unit configured to interpolate the undefined image signals of said each pixel to be processed according to each degree of changes associated with said other pixels, and according to each degree of changes associated with said pixel to be processed, wherein said degree of changes associated with said other pixels is a variation that exists between defined image signals of same color image signal pixels surrounding each of said other pixels in a horizontal and vertical direction, said degree of changes associated with said pixel to be processed is a variation that exists between defined image signals of like image signal pixels among said other pixels, and wherein each degree of changes is determined by determining a difference between at least 2 pixels adjacent to the pixel for which the degree of change is determined.

50. The image processing apparatus according to claim 49, wherein said other pixels are four pixels adjacent to said pixel to be processed, said interpolating unit is configured to determine each degree of changes associated with each of the four adjacent pixels by using a 3×3 pixel-area around each of the adjacent pixels, and said interpolating unit is also configured to determine each degree of changes associated with said pixel to be processed by using a 3×3 pixel-area around said pixel to be processed.

51. The image processing apparatus according to claim 49, wherein said interpolating unit is configured to interpolate undefined image signals of at least one pixel to be processed by using only defined image signals of said other pixels.

52. The image processing apparatus according to claim 49, wherein said interpolating unit is configured to interpolate undefined image signals of said pixel to be processed by weighting and averaging defined image signals of said other pixels.

* * * * *